US010335737B2

(12) United States Patent
Jons et al.

(10) Patent No.: US 10,335,737 B2
(45) Date of Patent: *Jul. 2, 2019

(54) FILTRATION ASSEMBLY INCLUDING SPIRAL WOUND BIOREACTORS AND MEMBRANE MODULES POSITIONED IN SEPARATE PRESSURE VESSELS

(71) Applicant: Dow Global Technologies LLC, Midland, MI (US)

(72) Inventors: Steven D. Jons, Eden Prairie, MN (US); Jon E. Johnson, Plymouth, MN (US); Steven Rosenberg, Shorewood, MN (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/552,447

(22) PCT Filed: Sep. 22, 2015

(86) PCT No.: PCT/US2015/051297
§ 371 (c)(1),
(2) Date: Aug. 21, 2017

(87) PCT Pub. No.: WO2016/167831
PCT Pub. Date: Oct. 20, 2016

(65) Prior Publication Data
US 2018/0043309 A1 Feb. 15, 2018

Related U.S. Application Data

(60) Provisional application No. 62/148,365, filed on Apr. 16, 2015.

(51) Int. Cl.
*B01D 61/04* (2006.01)
*C02F 3/12* (2006.01)
(Continued)

(52) U.S. Cl.
CPC ............ *B01D 61/04* (2013.01); *C02F 3/1273* (2013.01); *B01D 63/12* (2013.01);
(Continued)

(58) Field of Classification Search
CPC ........ B01D 63/10; B01D 63/12; B01D 61/02; B01D 61/04; B01D 61/08; B01D 61/10;
(Continued)

(56) References Cited

U.S. PATENT DOCUMENTS 3,720,322 A 3/1973 Harms
4,046,685 A 9/1977 Bray
(Continued)

FOREIGN PATENT DOCUMENTS

DE 3413551 10/1984
DE 4037765 4/1991
(Continued)

OTHER PUBLICATIONS

English language machine translation of JPH11197464, 13 pages, No Date.*
(Continued)

*Primary Examiner* — Pranav N Patel

(57) ABSTRACT

A filtration assembly including: a hyperfiltration assembly including: a high pressure vessel including a feed port, concentrate port and permeate port, and a plurality of serially arranged spiral wound hyperfiltration membrane modules; a bioreactor assembly including: a low pressure vessel comprising a first and second port, and a plurality of spiral wound bioreactors located within the low pressure vessel with each bioreactor comprising a flat sheet having two opposing bio-growth surfaces and a feed spacer spirally wound about an axis; and a fluid flow pathway extending from a fluid feed source: into the first port of the low pressure vessel, through the bioreactors and out the second
(Continued)

port of the low pressure vessel, and into the feed port of the high pressure vessel, through the membrane modules and out of the concentrate port and permeate port.

8 Claims, 5 Drawing Sheets

(51) Int. Cl.
  *B01D 63/12* (2006.01)
  *C02F 1/44* (2006.01)
  *C02F 103/08* (2006.01)

(52) U.S. Cl.
  CPC .. *B01D 2311/04* (2013.01); *B01D 2311/2688* (2013.01); *C02F 1/441* (2013.01); *C02F 1/442* (2013.01); *C02F 2103/08* (2013.01); *C02F 2201/004* (2013.01); *C02F 2201/007* (2013.01); *C02F 2203/006* (2013.01); *C02F 2209/001* (2013.01); *C02F 2209/03* (2013.01); *C02F 2301/02* (2013.01); *C02F 2303/20* (2013.01); *Y02W 10/15* (2015.05)

(58) Field of Classification Search
  CPC ........ B01D 2311/2688; B01D 2311/04; B01D 2311/06; C02F 1/441; C02F 1/442; C02F 2103/08; C02F 2201/007; C02F 2209/001; C02F 2209/03; C02F 3/1273
  See application file for complete search history.

(56) References Cited

U.S. PATENT DOCUMENTS

| | | | |
|---|---|---|---|
| 4,083,780 A | 4/1978 | Call | |
| 4,156,645 A | 5/1979 | Bray | |
| 4,214,994 A | 7/1980 | Kitano et al. | |
| 4,277,344 A | 7/1981 | Cadotte | |
| 4,476,015 A | 10/1984 | Schmitt et al. | |
| 4,511,471 A | 4/1985 | Müller | |
| 4,795,559 A | 1/1989 | Shinjou et al. | |
| 4,937,196 A | 6/1990 | Wrasidlo et al. | |
| 5,128,037 A | 7/1992 | Pearl et al. | |
| 5,238,563 A * | 8/1993 | Smith, Jr. ............... | B01D 65/00 210/321.74 |
| 5,362,393 A | 11/1994 | Kuhme | |
| 5,435,957 A | 7/1995 | Degen et al. | |
| 5,538,642 A | 7/1996 | Solie | |
| 5,563,069 A | 10/1996 | Yang | |
| 5,851,267 A | 12/1998 | Schwartz | |
| 5,851,356 A | 12/1998 | Banning et al. | |
| 5,919,026 A | 7/1999 | Appleton | |
| 6,066,254 A | 5/2000 | Huschke et al. | |
| 6,074,595 A | 6/2000 | Eisberg et al. | |
| 6,156,680 A | 12/2000 | Goettmann | |
| 6,165,303 A | 12/2000 | Darby et al. | |
| 6,187,200 B1 | 3/2001 | Yamamura et al. | |
| 6,224,767 B1 | 5/2001 | Fujiwara et al. | |
| 6,299,772 B1 | 10/2001 | Huschke et al. | |
| 6,632,356 B2 | 10/2003 | Hallan et al. | |
| 6,632,357 B1 | 10/2003 | Barger et al. | |
| 6,878,278 B2 | 4/2005 | Mickols | |
| 6,881,336 B2 | 4/2005 | Johnson | |
| 6,942,797 B1 | 9/2005 | Chancellor et al. | |
| 7,045,063 B2 | 5/2006 | Zhang et al. | |
| 7,048,855 B2 | 5/2006 | de la Cruz | |
| 7,063,789 B2 | 6/2006 | Colby et al. | |
| 7,144,511 B2 | 12/2006 | Vuong | |
| 7,198,719 B2 | 4/2007 | Chikura et al. | |
| 7,208,088 B2 | 4/2007 | Almasian et al. | |
| 7,311,831 B2 | 12/2007 | Bradford et al. | |
| 7,875,177 B2 | 1/2011 | Haynes et al. | |
| 7,951,295 B2 | 5/2011 | Larson et al. | |
| 8,110,016 B2 | 2/2012 | McCollam | |
| 8,142,588 B2 | 3/2012 | McCollam | |
| 8,173,003 B2 | 5/2012 | Li et al. | |
| 8,377,300 B2 | 2/2013 | Katayama et al. | |
| 8,388,842 B2 | 3/2013 | Shelby et al. | |
| 8,388,848 B2 | 3/2013 | Odaka et al. | |
| 8,425,773 B2 | 4/2013 | Bonta et al. | |
| 8,496,825 B1 | 7/2013 | Jons et al. | |
| 8,608,964 B2 | 12/2013 | Hiro et al. | |
| 8,758,489 B2 | 6/2014 | Elwell et al. | |
| 8,778,182 B2 | 7/2014 | Johnson et al. | |
| 2002/0074277 A1 | 6/2002 | Thomassen | |
| 2007/0151916 A1* | 7/2007 | Knappe ................. | B01D 61/18 210/321.74 |
| 2007/0272628 A1 | 11/2007 | Micklos et al. | |
| 2008/0308504 A1 | 12/2008 | Hallan et al. | |
| 2012/0085701 A1* | 4/2012 | Evans ................. | B01D 61/022 210/605 |
| 2012/0132575 A1 | 5/2012 | Kuennen et al. | |
| 2012/0193287 A1 | 8/2012 | Brouwer et al. | |
| 2012/0298578 A1 | 11/2012 | Herrington et al. | |
| 2014/0076794 A1 | 3/2014 | Sakraschinsky | |
| 2014/0166564 A1 | 6/2014 | Quintel | |
| 2016/0122219 A1 | 5/2016 | Tabata et al. | |

FOREIGN PATENT DOCUMENTS

| | | |
|---|---|---|
| DE | 102012011816 | 1/2013 |
| EP | 127243 | 12/1984 |
| EP | 1034829 | 9/2000 |
| FR | 2544995 | 11/1984 |
| GB | 1509712 | 5/1978 |
| JP | 58163404 | 9/1983 |
| JP | H11197464 | * 7/1999 |
| JP | 2001239136 | 9/2001 |
| JP | 2013202548 | 10/2013 |
| WO | 199638387 | 12/1996 |
| WO | 1998023361 | 6/1998 |
| WO | 2007043879 | 4/2007 |
| WO | 2011026521 | 3/2011 |
| WO | 2013048801 | 4/2013 |
| WO | 2013130312 | 9/2013 |
| WO | 2013154777 | 10/2013 |
| WO | 2014066035 | 5/2014 |
| WO | 2014120589 | 8/2014 |
| WO | 2015002194 | 1/2015 |
| WO | 2016048923 | 3/2016 |
| WO | 2016167832 | 10/2016 |

OTHER PUBLICATIONS

AiRO brochure, funded through the 7th Framework Programme of the EC, Logisticon Water Treatment b.v., van Staveren, van den Berg.

H.C. Flemming et al., Biofouling—the Achilles heel of membrane pricesses, Desalination, 113 (1997) 215-225.

H. Brouwer et al., Biofouling control in reverse osmosis membranes using rapid biofiltration technology, Desalination 199, vol. 11, issues 1-3 (2006) 15-17.

Vrouwenvelder et al., A novel scenario for biofouling control of spiral wound membrane systems, Water Research 45 (2011) 3890-3898.

* cited by examiner

A)

B)

FILTRATION ASSEMBLY INCLUDING SPIRAL WOUND BIOREACTORS AND MEMBRANE MODULES POSITIONED IN SEPARATE PRESSURE VESSELS

FIELD

The invention is directed toward a filtration assembly including a spiral wound bioreactor assembly located upstream from a spiral wound hyperfiltration membrane assembly.

INTRODUCTION

Spiral wound "hyperfiltration" membrane assemblies are used in a wide variety of nanofiltration and reverse osmosis fluid separations. In a conventional embodiment, one or more spiral wound membrane modules ("elements") are serially arranged and interconnected within a pressure vessel, During operation pressurized feed fluid is introduced into the vessel, successively passes through the individual modules and exits the vessel in at least two streams: concentrate and permeate. The performance of spiral wound membrane assemblies often deteriorate over time due to fouling. Fouling involves the formation of debris on various surfaces within the module. More common types of fouling include: scaling, colloidal or particle deposition, organic fouling (adsorption of organic compounds) and biofouling (growth of a biofilm on various surfaces within the module). Biofouling is typically mitigated by introducing oxidants (e.g. bleach), biocides or biostatic agents in the feed water upstream from spiral wound assembly. Feed water may also be pre-treated with a bioreactor to reduce nutrients that would otherwise contribute to biofouling within the spiral wound membrane assembly. Examples are described in WO2011/026521, US2012/132575, WO1996/38387, DE102012011816, JP2013/202548, WO2015/002194, US2012/0193287; U.S. Pat. No. 7,045,063, EP127243; H. C. Flemming et al., Desalination, 113 (1997) 215-225; and H. Brouwer et al., Desalination, vol. 11, issues 1-3 (2006) 15-17.

SUMMARY

The present invention utilizes a plurality of bioreactors housed within a common pressure vessel located upstream from one or more hyperfiltration assemblies. The bioreactors reduce bio-nutrients in feed liquid such that biofouling is reduced in the downstream hyperfiltration assembly. In a preferred embodiment, the subject filtration assembly includes:
  i) a hyperfiltration assembly including:
  a) a high pressure vessel including a feed port, concentrate port and permeate port, and
  b) a plurality of serially arranged spiral wound hyperfiltration membrane modules located within the high pressure vessel and each including at least one membrane envelop wound around a permeate tube forming a permeate pathway to the permeate port;
  ii) a bioreactor assembly including:
  b) a low pressure vessel including a first and second port, and
  b) a plurality of spiral wound bioreactors located within the low pressure vessel with each bioreactor comprising a flat sheet having two opposing bio-growth surfaces and a feed spacer spirally wound about an axis (Y) to form a cylindrical outer periphery extending along axis (Y) from a first end to a second end with an inlet scroll face located near the first end and an outlet scroll face located near the second end and center conduit (70), wherein the center conduits (70) of the bioreactors (52) are in fluid communication with each other and the second port (82); and
  iii) a fluid flow pathway extending from a fluid feed source: a) into the first port of the low pressure vessel, through the bioreactors and out the second port of the low pressure vessel, and b) into the feed port of the high pressure vessel, through the membrane modules and out of the concentrate port and permeate port.

In one preferred embodiment, the fluid flow pathway follows a parallel flow pattern through the bioreactors of the bioreactor assembly and a serial flow pattern through the membrane modules of the hyperfiltration assembly. In another embodiment, the spiral wound bioreactors are positioned in a parallel arrangement within the low pressure vessel. In yet another embodiment, the bioreactors are positioned in a serial arrangement within a cylindrical inner chamber of the low pressure vessel. Many additional embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

Figure 1:
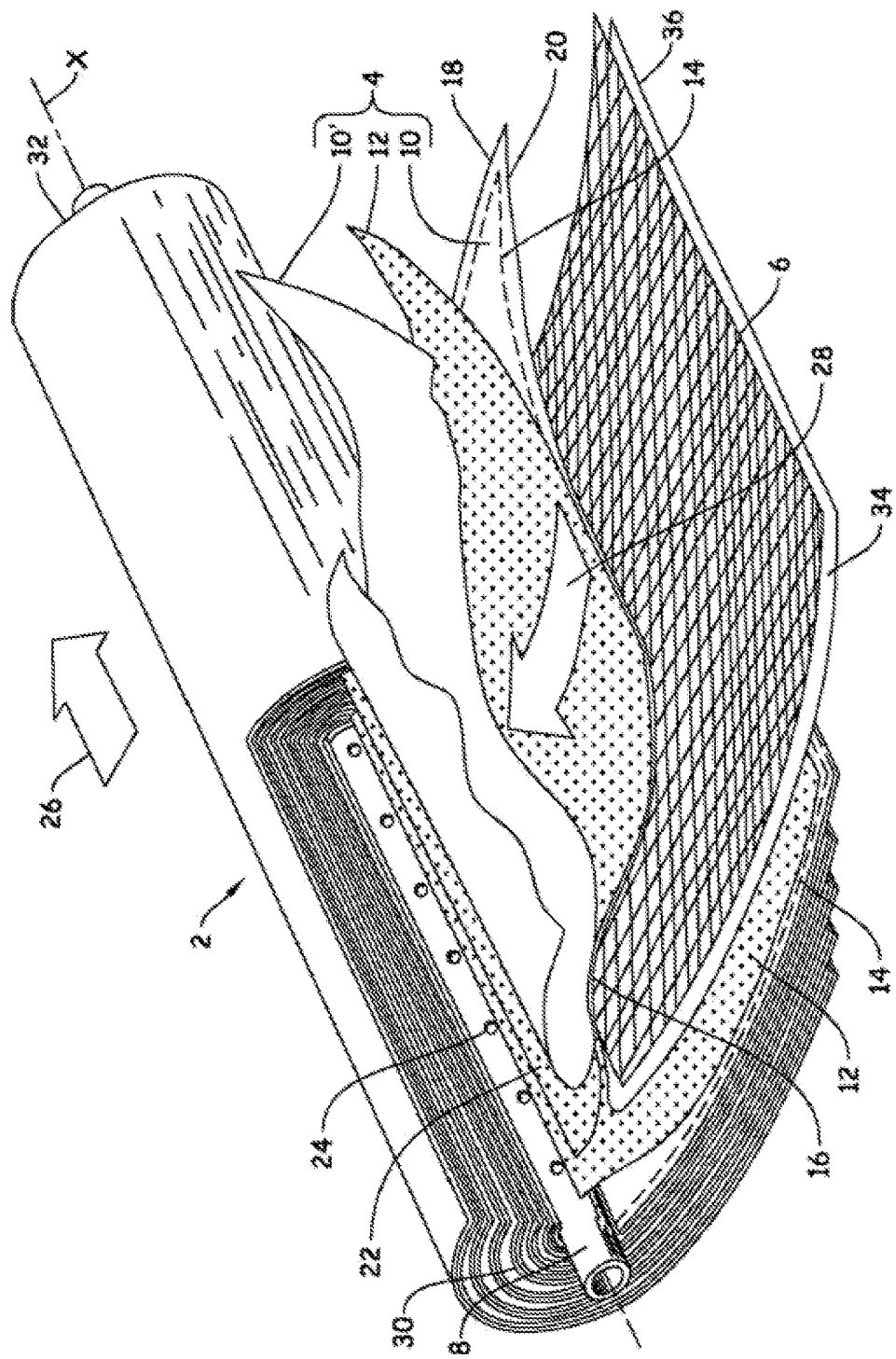
FIG. 1 is a perspective, partially cut-away view of a spiral wound membrane module.

The invention includes a filtration assembly along with its use in the treatment of various fluids, e.g. brackish water, sea water, waste water, etc. The filtration assembly includes a bioreactor assembly located upstream from a hyperfiltration assembly. With such an arrangement, bio-nutrients present in the feed fluid are consumed by microorganisms present in the bioreactor assembly and are less available to cause biofouling in the downstream hyperfiltration assembly.

The bioreactor assembly includes a plurality of bioreactors, preferably spiral wound bioreactors located within a common (low) pressure vessel. The hyperfiltration assembly includes a plurality of spiral wound membrane modules located in a serial arrangement and serial flow pattern within a common (high) pressure vessel. In operation, a source of pressurized feed fluid (e.g. waste water pressurized to 0.1 to 1 MPa) passes along a fluid flow pathway successively through the bioreactor assembly and hyperfiltration assembly. Additional filter unit operations may be included along the fluid flow pathway. For example, a microfiltration device (average pore diameter of from 0.1 to 10 µm) or ultrafiltration device (average pore diameter of 0.001-0.1 µm) e.g. hollow fiber membrane module, or cartridge filter (average pore diameter of from 10 to 50 µm) may be positioned along the fluid flow pathway at a location including between the hyperfiltration assembly and the bioreactor assembly and between a feed fluid source and the bioreactor assembly. Various combinations of one or more bioreactor assemblies may be used with one or more hyperfiltration assemblies. For example, a single bioreactor assembly may supply pre-treated fluid to a plurality of hyperfiltration assemblies, either positioned in a parallel flow configuration with each other, or in a serial configuration wherein either permeate or concentrate from a first (upstream) hyperfiltration assembly is supplied to a downstream hyperfiltration assembly. Similarly, multiple bioreactors arranged in a parallel flow configuration may supply a common downstream hyperfiltration assembly.

The spiral wound membrane modules ("elements") useful in the present invention include those designed for use in reverse osmosis (RO) and nanofiltration (NF), collectively referred to as "hyperfiltration." In general, spiral wound membrane modules include one or more membrane envelops and feed spacer sheets wound around a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons.

A representative spiral wound membrane module is generally shown in FIG. 1. The module (2) is formed by concentrically winding one or more membrane envelopes (4) and feed spacer sheet(s) ("feed spacers") (6) about a permeate collection tube (8). Each membrane envelope (4) preferably comprises two substantially rectangular sections of membrane sheet (10, 10'). Each section of membrane sheet (10, 10') has a membrane or front side (34) and support or back side (36). The membrane envelope (4) is formed by overlaying membrane sheets (10, 10') and aligning their edges. In a preferred embodiment, the sections (10, 10') of membrane sheet surround a permeate channel spacer sheet ("permeate spacer") (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with a plurality of openings (24) extending along the length of the permeate collection tube (8). The module (2) preferably comprises a plurality of membrane envelopes (4) separated by a plurality of feed spacers sheets (6). In the illustrated embodiment, membrane envelopes (4) are formed by joining the back side (36) surfaces of adjacently positioned membrane leaf packets. A membrane leaf packet comprises a substantially rectangular membrane sheet (10) folded upon itself to define two membrane "leaves" wherein the front sides (34) of each leaf are facing each other and the fold is axially aligned with the proximal edge (22) of the membrane envelope (4), i.e. parallel with the permeate collection tube (8). A feed spacer sheet (6) is shown located between facing front sides (34) of the folded membrane sheet (10). The feed spacer sheet (6) facilitates flow of feed fluid in an axial direction (i.e. parallel with the permeate collection tube (8)) through the module (2). While not shown, additional intermediate layers may also be included in the assembly. Representative examples of membrane leaf packets and their fabrication are further described in U.S. Pat. No. 7,875,177.

During module fabrication, permeate spacer sheets (12) may be attached about the circumference of the permeate collection tube (8) with membrane leaf packets interleaved there between. The back sides (36) of adjacently positioned membrane leaves (10, 10') are sealed about portions of their periphery (16, 18, 20) to enclose the permeate spacer sheet (12) to form a membrane envelope (4). Suitable techniques for attaching the permeate spacer sheet to the permeate collection tube are described in U.S. Pat. No. 5,538,642. The membrane envelope(s) (4) and feed spacer(s) (6) are wound or "rolled" concentrically about the permeate collection tube (8) to form two opposing scroll faces (30, 32) at opposing ends and the resulting spiral bundle is held in place, such as by tape or other means. The scroll faces of the (30, 32) may then be trimmed and a sealant may optionally be applied at the junction between the scroll face (30, 32) and permeate collection tube (8), as described in U.S. Pat. No. 7,951,295. Long glass fibers may be wound about the partially constructed module and resin (e.g. liquid epoxy) applied and hardened. In an alternative embodiment, tape may be applied upon the circumference of the wound module as described in U.S. Pat. No. 8,142,588. The ends of modules may be fitted with an anti-telescoping device or end cap (not shown) designed to prevent membrane envelopes from shifting under the pressure differential between the inlet and outlet scroll ends of the module. Representative examples are described in: U.S. Pat. Nos. 5,851,356, 6,224,767, 7,063,789, 7,198,719 and WO2014/120589. While not a required aspect of the invention, preferred embodiments of the invention include end caps which include a locking structure for preventing relative axial movement between engaged end caps. Such a locking structure between end caps may be engaged by aligning adjacent end caps so that one or more projections or catches extending radially inward from the inside of the outer hub of one end cap enter corresponding receptacles arranged about the outer hub of the facing end cap. The end caps are then engaged by rotating one end cap relative to the other until the projections or "catches" contact or "hook" with a corresponding structure of the receptacle. This type of locking end cap is available from The Dow Chemical Company under the iLEC™ mark and is further described in U.S. Pat. Nos. 6,632,356 and 8,425,773. If such end caps are not used, interconnecting tubes may be used to prevent mixing of permeate with feed. In order to restrict feed fluid from bypassing the elements within the vessel, various types of seals (e.g. Chevron-type, O-rings, U-cup type, etc.) may be positioned between the outer periphery of the elements and the inner periphery of the vessel. Representative examples are described in: U.S. Pat. Nos. 8,758,489, 8,388,842, 8,110,016, 6,299,772, 6,066,254, 5,851,267, 8,377,300 and WO2014066035. In some embodiments, seal assemblies are equipped with a bypass that permits limited feed fluid to flow around the elements, e.g. see U.S. Pat. Nos. 5,128,037, 7,208,088 and 8,778,182.

Materials for constructing various components of spiral wound membrane modules are well known in the art. Suitable sealants for sealing membrane envelopes include urethanes, epoxies, silicones, acrylates, hot melt adhesives and UV curable adhesives. While less common, other sealing means may also be used such as application of heat, pressure, ultrasonic welding and tape. Permeate collection tubes are typically made from plastic materials such as acrylonitrile-butadiene-styrene, polyvinyl chloride, polysulfone, poly (phenylene oxide), polystyrene, polypropylene, polyethylene or the like. Tricot polyester materials are commonly used as permeate spacers. Additional permeate spacers are described in U.S. Pat. No. 8,388,848. Representative feed spacers include polyethylene, polyester, and polypropylene mesh materials such as those commercially available under the trade name VEXAR™ from Conwed Plastics. Preferred feed spacers are described in U.S. Pat. No. 6,881,336. In a preferred embodiment, the feed spacer used in the present invention has a thickness less that 0.5 mm. Alternatively, the feed spacer may comprise a plurality of raised regions formed on the membrane sheet, e.g. an embossed patterned formed by a die or roller, spheres or lines of polymer deposited upon the membrane sheet, a corrugated film, etc. (See for example U.S. Pat. Nos. 6,632,357 and 7,311,831.)

The membrane sheet is not particularly limited and a wide variety of materials may be used, e.g. cellulose acetate materials, polysulfone, polyether sulfone, polyamides, polyvinylidene fluoride, etc. A preferred membrane sheet includes FilmTec Corporation's FT-30™ type membranes, i.e. a flat sheet composite membrane comprising a backing layer (back side) of a nonwoven backing web (e.g. a non-woven fabric such as polyester fiber fabric available from Awa Paper Company), a middle layer comprising a porous support having a typical thickness of about 25-125 μm and top discriminating layer (front side) comprising a thin film polyamide layer having a thickness typically less than about 1 micron, e.g. from 0.01 micron to 1 micron but more commonly from about 0.01 to 0.1 μm. The backing layer is not particularly limited but preferably comprises a non-woven fabric or fibrous web mat including fibers which may be orientated. Alternatively, a woven fabric such as sail cloth may be used. Representative examples are described in U.S. Pat. Nos. 4,214,994; 4,795,559; 5,435,957; 5,919,026; 6,156,680; 8,608,964 and 7,048,855. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. The discriminating layer is preferably formed by an interfacial polycondensation reaction between a polyfunctional amine monomer and a polyfunctional acyl halide monomer upon the surface of the microporous polymer layer as described in U.S. Pat. Nos. 4,277,344 and 6,878,278.

Arrows shown in FIG. 1 represent the approximate flow directions (26, 28) of feed and permeate fluid (also referred to as "product" or "filtrate") during operation. Feed fluid enters the module (2) from an inlet scroll face (30) and flows across the front side(s) (34) of the membrane sheet(s) and exits the module (2) at the opposing outlet scroll face (32). Permeate fluid flows along the permeate spacer sheet (12) in a direction approximately perpendicular to the feed flow as indicated by arrow (28). Actual fluid flow paths vary with details of construction and operating conditions.

While modules are available in a variety of sizes, one common industrial RO module is available with a standard 8 inch (20.3 cm) diameter and 40 inch (101.6 cm) length. For a typical 8 inch diameter module, 26 to 30 individual membrane envelopes are wound around the permeate collection tube (i.e. for permeate collection tubes having an outer diameter of from about 1.5 to 1.9 inches (3.8 cm-4.8 cm)). Less conventional modules may also be used, including those described in U.S. Pat. No. 8,496,825.

Figure 2:
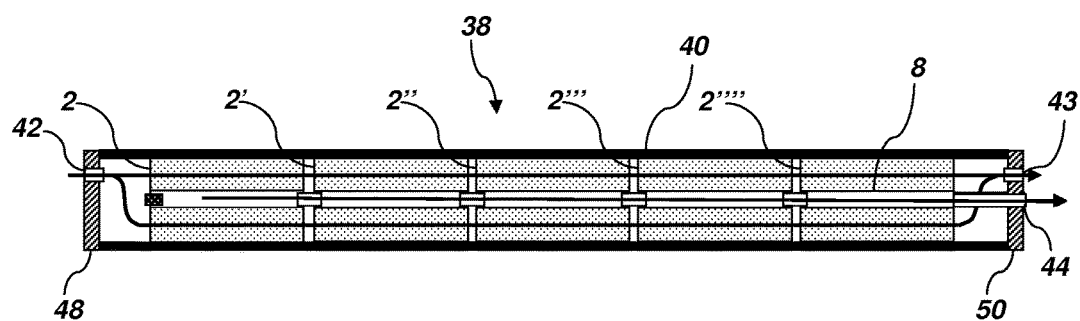
FIGS. 2A-B are cross-sectional views of various embodiments of hyperfiltration assemblies including a plurality of spiral wound membrane modules serially arranged within a high pressure vessel.
Figure 2:
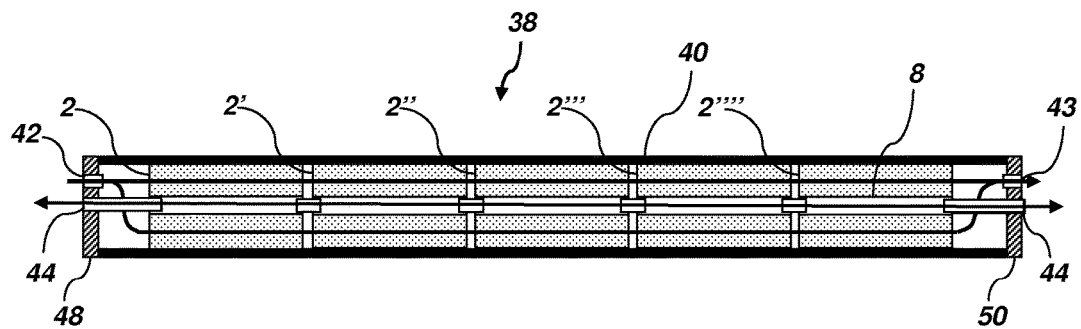

FIGS. 2A-B illustrate two classic embodiments of hyperfiltration assemblies (38) suitable for the present invention. As shown, the assembly (38) includes a high pressure vessel (40) including a feed port (42), concentrate port (43) and permeate port (44). A variety of similar configurations including combinations of ports located at the sides and ends of the pressure (40) are known and may be used. A plurality of spiral wound membrane modules (2, 2', 2", 2''', 2'''') are serially arranged within the pressure vessel (40). The pressure vessel used in the present invention is not particularly limited but preferably include a solid structure capable of withstanding pressures associated with operating conditions. As fluid pressures used during operation typically exceed 1.5 MPa (e.g. 1.6 to 2.6 M for brackish water, 6 to 8 MPa for seawater), pressure vessels used in hyperfiltration are referred to herein as "high" pressure vessels. The vessel structure preferably includes a chamber (46) having an inner periphery corresponding to that of the outer periphery of the spiral wound membrane modules to be housed therein, e.g. cylindrical. The length of the chamber preferably corresponds to the combined length of the spiral wound membrane modules to be sequentially (axially) loaded. Preferably, the vessel contains at least 2 to 8 spiral wound membrane modules arranged in series with their respective permeate tubes (8) in fluid communication with each other to form a permeate pathway to the permeate port (44). Fluid flow into the feed port (42) and out the concentrate and permeate ports (43, 44) are generally indicated by arrows. The pressure vessel (40) may also include one or more end plates (48, 50) that seal the chamber (46) once loaded with modules (2). The orientation of the pressure vessel is not particularly limited, e.g. both horizontal and vertical orientations may be used. Examples of applicable pressure vessels, module arrangements and loading are described in: U.S. Pat. Nos. 6,074,595, 6,165,303, 6,299,772, US 2007/0272628 and US 2008/0308504. Manufacturers of pressure vessels include Pentair of Minneapolis Minn., Protec-Arisawa of Vista Calif. and Bel Composite of Beer Sheva, Israel.

An individual pressure vessel or a group of vessels working together, each equipped with one or more spiral wound membrane modules, can be referred to as a "train" or "pass." The vessel(s) within the pass may be arranged in one or more stages, wherein each stage contains one or more vessels operating in parallel with respect to a feed fluid. Multiple stages are arranged in series, with the concentrate fluid from an upstream stage being used as feed fluid for the downstream stage, while the permeate from each stage is collected without further reprocessing within the pass. Multi-pass hyperfiltration systems are constructed by interconnecting individual passes along a fluid pathway as described in: U.S. Pat. Nos. 4,156,645, 6,187,200, 7,144,511 and WO2013/130312.

The filtration assembly of the present invention also includes a bioreactor assembly including a plurality of bioreactors located within a low pressure vessel. The preferred bioreactors used in the present invention include a spiral wound configuration similar to that described above with respect to the membrane modules. However, as no fluid separation occurs in the bioreactor, the bioreactor preferably includes no membrane envelope. As best shown in FIGS. 3A-C, applicable bioreactors (52) include a flat sheet (54) having two opposing bio-growth surfaces (56, 56') and a feed spacer (58) spirally wound about an axis (Y) to form a cylindrical outer periphery extending along axis (Y) from a first end (60) to a second end (62) with an inlet scroll face (64) located near the first end (60) and an outlet scroll face (66) located near the second end (62). In specific regard to the embodiment illustrated in FIG. 3B, the flat sheet (54) and spacer (58) are spirally wound about a hollow conduit (70). By contrast, embodiments shown in FIGS. 3A and 3C do not include a hollow conduit. In an alternative embodiment not shown, the hollow conduit may be replaced with a solid rod. While shown in FIG. 3B as including a hollow conduit (70), the conduit of the bioreactor is preferably impermeable and thus sealed from direct fluid communication with the flat sheet and feed spacer, except through the ends of the conduit. The inner surface (71) of the conduit (70) is preferably in fluid communication with the flat sheet and feed spacer only through the inlet or outlet scroll faces (64, 66).

Figure 3:
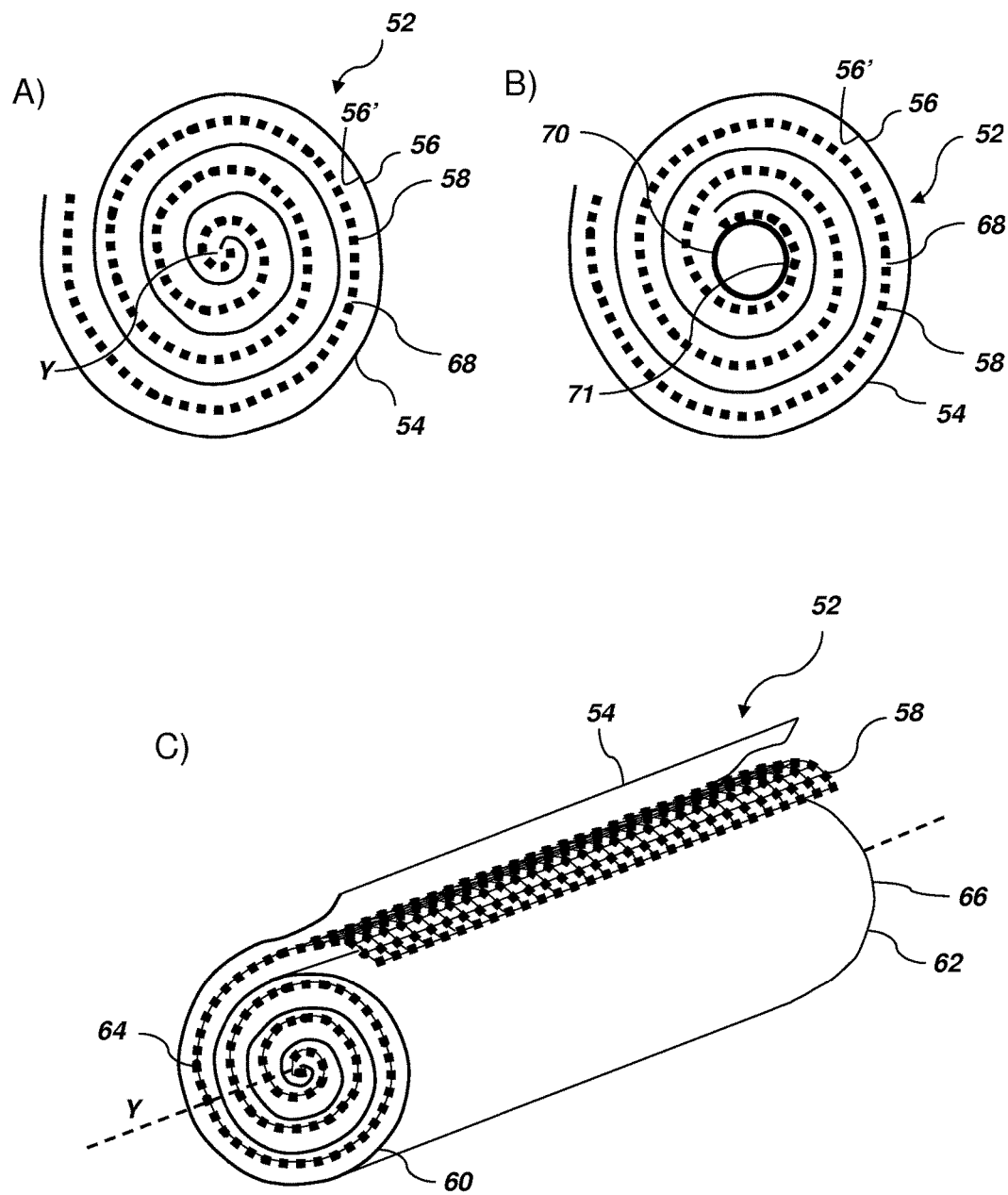
FIGS. 3A-B are elevation views of spiral wound bioreactors.
FIG. 3C is a perspective view of a spiral wound bioreactor.
Figure 4:
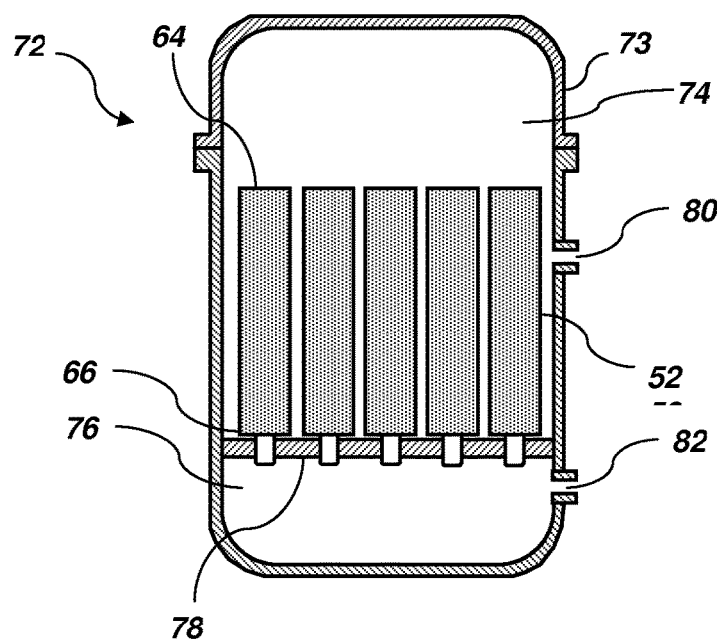
FIG. 4 is a cross-sectional view of a bioreactor assembly including a plurality of spiral wound bioreactors positioned in a parallel arrangement within a low pressure vessel.
Figure 5:
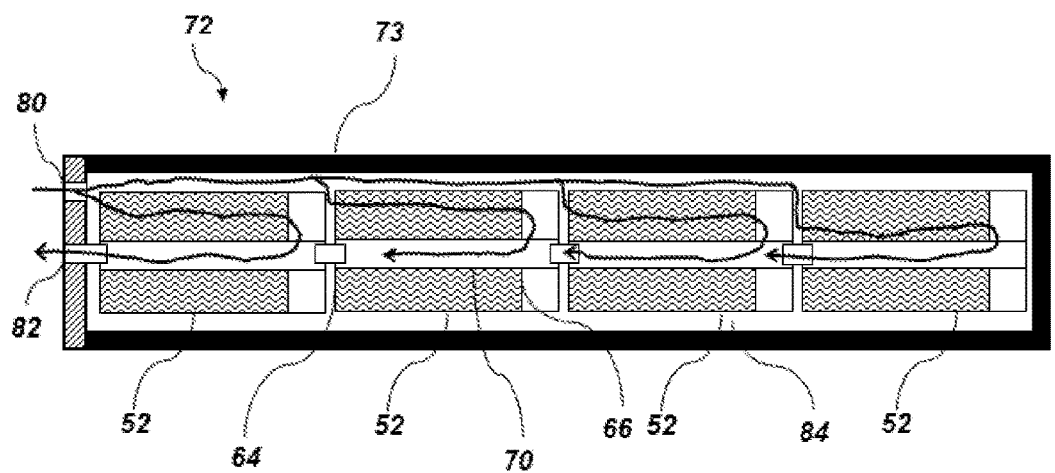
FIG. 5 is a cross-sectional view of an embodiment of a bioreactor assembly including a plurality of spiral wound bioreactors positioned in a serial arrangement within a low pressure vessel.

FIGS. 4 and 5 illustrate two bioreactor assemblies (72) that include a plurality of individual spiral wound bioreactors (52). Each of FIGS. 3, 4, and 5 show that the bioreactor does not function as a spiral wound membrane module in that the flat sheet does not produce a permeate per se. Rather, feed passes into an inlet scroll face (64) of the bioreactor, passes along flow channels (68) of the feed spacer (58) and exits via an outlet scroll face (66). However, in some embodiments, feed flowing through the flow channels may be routed back through the bioreactor by way of the center conduit (70). Such an embodiment is described in connection with FIG. 5, where fluid flow enters the conduit after passing through the outlet scroll face (66). While passing through the bioreactor (52), liquid (e.g. water) contacts the flat sheet (54) which provides a platform for microorganisms to reside. Nutrients in the feed are consumed by microorganisms, so that liquid exiting the bioreactor is depleted of nutrients prior to passing to downstream spiral wound membrane modules.

The feed spacer (58) preferably provides flow channels (68) of between 0.1 mm and 1.5 mm, more preferably between 0.15 mm and 1.0 mm, between adjacent bio-growth surfaces (56, 56'). A channel of less than 0.15 mm is more easily occluded by bio-growth, so that pressure drop through the flow channels requires more frequent cleanings. A channel of greater than 1.0 mm is less efficient at creating bio-growth that is desired to eliminate problematic nutrients. As with spiral wound membrane modules (2, 2', 2'', 2''', 2''''), the spiral wound bioreactor (52) may be made with more than one overlapping flat sheet and spacer, but it is preferred to use at most two flat sheets (54) separated by spacers (58). Most preferably, each bioreactor comprises only a single spiral wound flat sheet (54). In a preferred embodiment, the unrolled length of flat sheet (54) from an upstream bioreactor (52) exceeds the unrolled length of a membrane envelope (4) from a downstream hyperfiltration module (2) by at least a factor of three, and more preferably by at least a factor of ten. (In this context, the unrolled lengths of flat sheet (54) and membrane envelope (4) are measured in the direction perpendicular to a central axis (X or Y, respectively, from FIGS. 1 and 3).

The bioreactor (52) includes bio-growth surfaces (56, 56') and flow channels (68) that extend from the inlet scroll face (64) to the outlet scroll face (66). Because of the relatively high flow rates desired in many embodiments of the invention, growth surfaces may be defined as those surfaces adjacent the flow channels (68) that connect the inlet scroll face (64) and outlet scroll face (66) of the bioreactor (52). In order to operate at high flow rates while removing the bulk of bio-nutrients that can lead to fouling in downstream spiral wound membrane modules, a large area of bio-growth surface contacting the flow channels is desired, while still providing minimal resistance to flow through the bioreactor. Preferably, the void volume (volume not occupied by a solid between bio-growth surfaces) of flow channels comprises at least 65% (more preferably 75% or even 85%) of the volume of the bioreactor. The ratio of bio-growth surface area to bioreactor volume for each bioreactor is preferably between 15 $cm^{-1}$ and 150 $cm^{-1}$ (more preferably between 20 $cm^{-1}$ and 100 $cm^{-1}$). In one embodiment, a flat sheet may provide bio-growth surfaces whereas flow channels may be provided by the space between or by way of a spacer material including grooves or flow pathways (e.g. woven material, etc.)

The flat sheet (54) of a bioreactor (52) may be impermeable. Alternatively, to aid in cleaning, the opposing bio-growth surfaces (56, 56') may be in fluid communication with each other through the matrix of a porous flat sheet (54). While not particularly limited, a permeable flat sheet may include a generally impermeable sheet with perforations, a UF or MF membrane, woven or nonwoven material, fibrous matrix, etc. Examples of suitable materials are described in U.S. Pat. No. 5,563,069. However, unlike the general design described in U.S. Pat. No. 5,563,069, the flat sheet of the present invention includes bio-growth surfaces (56, 56') on both outer faces which are separated by a feed spacer (58). Preferred materials include polymer sheets having pore sizes greater than 0.1 µm, or greater than 10 µm. The polymer sheet may also include macropores of sizes greater than 10 µm which facilitate disturbing fluid into fouled regions during cleaning. Applicable polymers include but are not limited to polyethylene, polypropylene, polysulfone, polyether sulfone, polyamides, and polyvinylidene fluoride. As the bioreactor of this invention preferably operates at relatively high flow rates, the flat sheet thickness is preferably less than the spacer thickness. Preferably, the flat sheet thickness is less than 1 mm, and more preferably less than 0.5 mm, less than 0.2 mm, or even less than 0.1 mm. The thickness of the flat sheet (54) in bioreactors (52) is preferably less than 25% of the thickness of a membrane envelopes (4) in downstream hyperfiltration modules (2).

The feed spacer (58) of a bioreactor (52) is not particularly limited and includes the feed spacers described above in connection with spiral wound membrane modules. It is desired that the majority of flat sheet adjacent a spacer is not occluded by contact with the spacer. Preferred structures for spacers include a net-like sheet material having intersection points of greater thickness than the average thickness of strands therebetween. The spacer may be a collection of raised regions of the flat sheet, such as formed by a bossing step, by application of adhesive lines to the flat sheet, or by affixing of appropriately-sized core/shell balls to the surface. Once spirally wound, the feed spacer preferably provides flow channels of from 0.10 mm to 1.5 mm, more preferably 0.15 mm to 1.0 mm, between adjacent bio-growth surfaces of the flat sheet. When provided in a sheet format, proximate feed spacer (58) and flat sheet (54) sections may be selectively bound together, e.g. adhered together along portions of their periphery or intermittent regions on their surfaces. Similarly, adjacent biogrowth surfaces may be affixed at some locations to prevent relative movement therebetween, but still allow feed movement through the flow channel. Such bonding adds strength to the bioreactor, preventing extrusion of the spacer and mitigating telescoping.

The outer periphery of the bioreactor (52) is preferably cylindrical and may be finished in the same manner as described above with respect to spiral wound membrane modules, e.g. tape, fiberglass, etc. The bioreactor may alternatively be encased in a molded, shrink-wrapped, or extruded shell (e.g. PVC or CPVC). Alternatively or additionally, the bioreactor may include anti-telescoping devices which are commonly used in connection with spiral wound membrane modules. In one embodiment, the bioreactor includes an end cap that interlocks with an adjacent spiral wound membrane module (see for example U.S. Pat. Nos. 6,632,356 and 8,425,773). In another embodiment, to prevent mixing of the feed that has been treated by the bioreactor with feed that has not been treated, the end cap may provide seals for connecting to collection chambers inside the low pressure vessel. In another embodiment, the end cap may provide seals and/or locking features for connecting to adjacent bioreactors.

The outer periphery of the bioreactor (52) is preferably cylindrical and is sized to fit within a pressure vessel. In a preferred embodiment, the bioreactor has an outer diameter within 10% of a distance selected from 185 mm and 370 mm. These dimensions may be similar to those of standard 8-inch diameter spiral wound membrane modules and they allow the bioreactor to fit within the most common dimensions of similarly-sized vessels and pipes. While the scroll faces (64, 66) of the cylindrical bioreactor (52) may be flat, other configurations may be used. For example, when the bioreactor (52) is within a pressure vessel (73) comprises a side port for feed liquid, increased volume of the bioreactor may be obtained by extending the bioreactor closer to the upstream end of the vessel in locations that do not interfere with flow out of the vessel's ports.

A plurality of bioreactors (52) are located within a common pressure vessel. The bioreactors may be arranged in a parallel (FIG. 4) or serial arrangement (FIG. 5); however, the fluid flow pathway through the bioreactors is preferably a parallel flow pattern.

The pressure vessel may be the same or similar to those described in connection with the hyperfiltration assembly. However, for purposes of clarity, the pressures vessels used in the bioreactor assembly are characterized herein as "low" pressure simply due to their typical operating pressures, e.g. 60 kPa to 600 kPa. However, in some embodiments it may be preferably to operate the bioreactor assembly at fluid pressures similar to that used in the hyperfiltration assembly.

FIG. 4 illustrates one embodiment of a bioreactor assembly (72) including a low pressure vessel (73) which defines a first (74) and second (76) chamber separated by a divider (78) including a first port (80) is in fluid communication with the first chamber (74) and the second port (82) in fluid communication with the second chamber (76). The spiral wound bioreactors (52) are positioned in a parallel arrangement within the low pressure vessel with the inlet scroll face (64) of each bioreactor in fluid communication with the first chamber (76) and the outlet scroll face (66) of each bioreactor in fluid communication with the second chamber (78). A fluid flow pathway extends from the fluid feed source (not shown) into the first port (80) of the low pressure vessel (73), into the first chamber (74), through the inlet scroll face (64) and outlet scroll face (66) of the bioreactors (52), into the second chamber (76) of the low pressure vessel and out of the second port (82) of the low pressure vessel.

FIG. 5 illustrates an embodiment of a bioreactor assembly (72) including a low pressure vessel (73) including a chamber (84) having a first port (80) and second port (82). The spiral wound bioreactors (52) are positioned in a serial arrangement within the low pressure vessel (73). As generally indicated by arrows, a fluid flow pathway extends from a fluid feed source (not shown) through the first port (80) and into the chamber (84) of the low pressure vessel (73), through the inlet scroll faces (64) and out of the outlet scroll faces (66) of the bioreactors (52), and out of the second port (82) of the low pressure vessel (73). As with the embodiment illustrated in FIG. 4, the fluid flow pathway generally follows a parallel flow pattern through the bioreactors. (The fluid flow path is divided into two or more "parallel" paths before recombining.) In one preferred embodiment, the bioreactors (52) include a center conduit (70) as illustrated in FIG. 3B, wherein the conduits (70) of the bioreactors (52) are in fluid communication with each other and the outlet (82).

Figure 6:
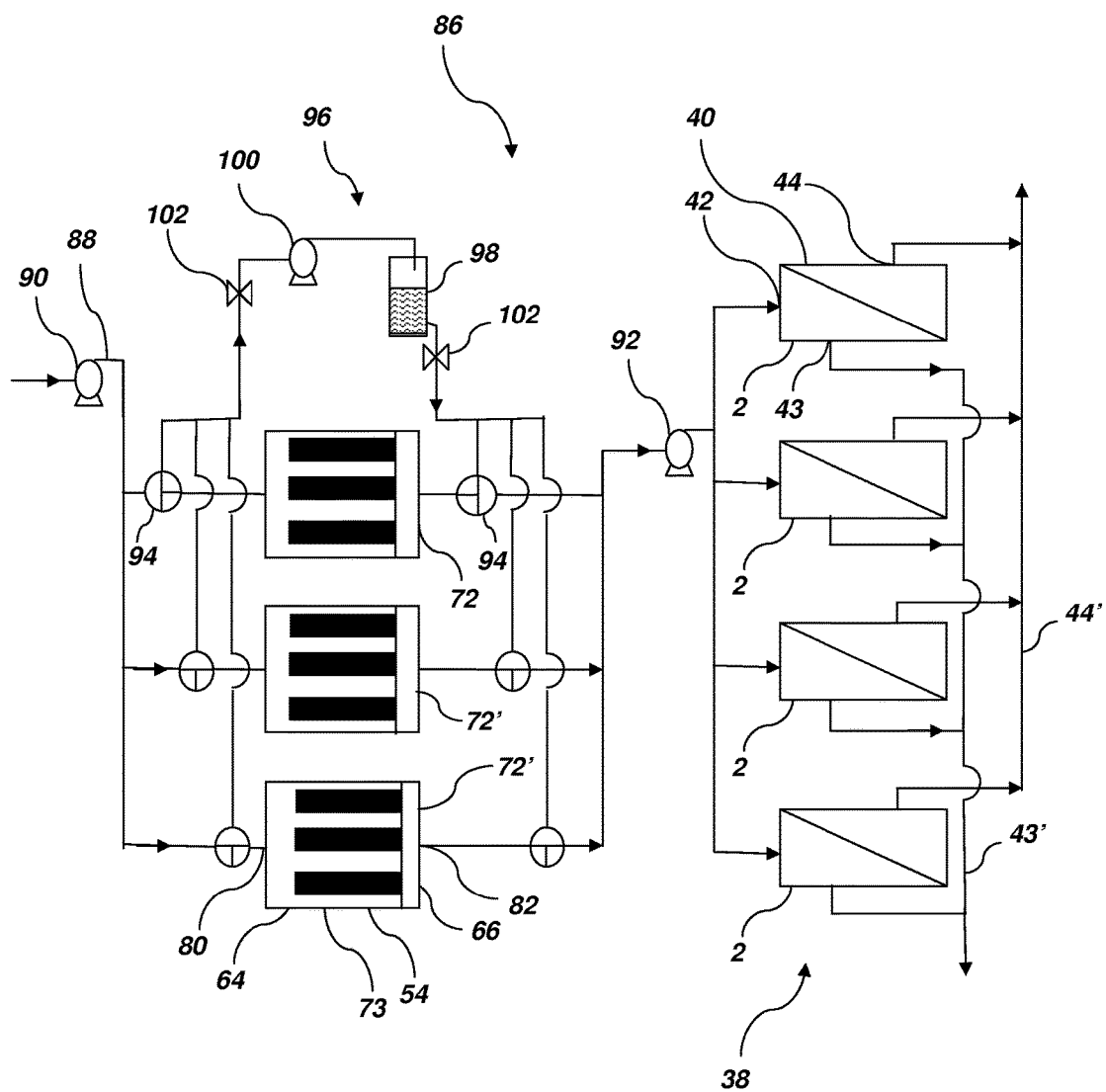
FIG. 6 is a schematic view of an embodiment of the subject filter assembly.

FIG. 6 schematically illustrates an embodiment of the filtration assembly (86) including a plurality of bioreactor assemblies (72,72') adapted for connection to a source of pressurized feed fluid (88) and positioned upstream from a plurality of hyperfiltration assemblies (38). Representative feed fluids include brackish water, sea water and waste water. The assembly may include one or more pumps (90, 92) for producing the desired fluid pressure. Preferably, a pump (92) exists at least between a low pressure vessel (73) for bioreactors (52) and a high pressure vessel (40) for hyperfiltration membrane modules (2). The assembly (86) includes a fluid flow pathway (generally indicated by arrows) extending from the fluid feed source (88) and into the first ports (80) of the low pressure vessels (73), through the bioreactors (52) and out the second port (82), into the feed ports (42) of the high pressure vessels (40), through the membrane modules (2) and out of the concentrate ports (43) and permeate ports (44). Concentrate (43') and permeate (44') from a plurality of hyperfiltration assemblies (38) may be combined and optionally subject to additional treatment, e.g. further treatment with hyperfiltration assemblies (not shown). The bioreactor assemblies (72) and hyperfiltration assemblies (38) may be connected by way of standard piping, valves, pressure sensors, etc. In a preferred embodiment, the bioreactor assemblies and hyperfiltration assemblies are sized such that the pressure drop for flow through a bioreactor assembly is less than 10% of the pressure drop through a hyperfiltration assembly (as measured at start up using non-fouled assemblies using pure water at 25° C. and a flow rate through the hyperfiltration assembly(ies) of 15 gfd). In a preferred embodiment of the filtration system, the total area of bio-growth surface within the bioreactor assembly(ies) is greater than sum total of membrane area contained within the lead (first in series) hyperfiltration modules in the subsequent stage of parallel high pressure vessels. The hyperfiltration assemblies are preferably operated at a permeate recovery of at least 90% and more preferably 95%. This high level of permeate recovery operation is sustainable due to the biofouling prevention provided by the upstream bioreactor assembly.

In the embodiment shown in FIG. 6, valves (94) are positioned near the first and second ports (80, 82) of each bioreactor assembly (72). The valves (94) allow a bioreactor assembly (72) to be isolated from a common source of pressurized feed fluid (88) and other bioreactor assemblies (72'). In this way, an individual bioreactor assembly (72) may be taken off-line while the other bioreactor assemblies (72') remain in operation with feed fluid passing therethrough. In some embodiments, a portable cleaning system may be connected to isolated bioreactor assemblies (72). In FIG. 6, the filtration assembly (86) includes an optional cleaning assembly (96) including a cleaning flow pathway extending from the first port (80) of a bioreactor assembly (72), through a source of cleaning agent (98), to the second port (82) and through the individual bioreactors (52) within a low pressure vessel (73) to exit assembly (72) at the first port (80).

A bioreactor assembly (72) may alternate between an operating mode and a cleaning mode. In the operating mode, fluid from the first port (80) passes through parallel bioreactors (52), from inlet scroll face (64) to outlet scroll face (66), exiting the bioreactor assembly at its second port (82). The cleaning flow pathway may be reversed, or combinations of flow directions may be used. The cleaning assembly may include a separate pump (100) and valve assembly (102). The cleaning assembly (96) and related flow path are isolated from the hyperfiltration assemblies (38), and as such, a wider range of cleaning agents may be used without compromising the integrity of the membranes of the hyperfiltration assemblies (38). Representative cleaning agents include acid solutions having a pH of less than 2, basic solutions having a pH greater than 12, solutions including biocides, aqueous solutions at elevated temperature (e.g. greater than 40° C., 60° C. or 80° C.), and oxidants, e.g. aqueous chlorine solutions (e.g. at least 10 ppm, 100 ppm or even 1000 ppm of chlorine). Preferably, the cleaning fluid has an average residence time of less than 10 seconds (1 to 10 seconds) within the bioreactor; more preferably the average residence is less than 5 seconds within the bioreactor.

After cleaning, the bioreactor assembly (72) may be flushed, e.g. with one or more of clean water, feed fluid, or an inoculation solution including microorganisms in a manner similar to that described with respect to the cleaning assembly. The inoculation solution may include liquid previously extracted from the bioreactor assembly (e.g. prior to or during cleaning). A nutrient may also be dosed during at least a part of the operating mode. In a preferred embodiment, the pressure difference across a bioreactor (52) or bioreactor assembly (72) is measured in the operating mode, and switching from the operating mode to the cleaning mode is triggered by the measured pressure difference. Preferably, the pressure difference across the bioreactor assembly (72) is less than 10 psi (more preferably less than 5 psi) after the cleaning mode. In one embodiment, the cleaning mode is commenced after a measured pressure drop of the bioreactor exceeds 10 psi, or more preferably after it exceeds 20 psi.

Many embodiments of the invention have been described and in some instances certain embodiments, selections, ranges, constituents, or other features have been characterized as being "preferred." Such designations of "preferred" features should in no way be interpreted as an essential or critical aspect of the invention. For instance, it will be appreciated that a spiral wound bioreactor has advantages, but that various alternatives configurations could include hollow fiber, plate and frame, a packed bed of particulates, and a fluidized bed. For other geometries, it is still preferred that the bioreactor be cylindrical, that flow channels (68) extending through the bioreactor have a void volume of at least 65% (more preferably 75% or even 85%) of the volume of the bioreactor, and that the ratio of bio-growth surface area to bioreactor volume for each bioreactor is preferably between 15 cm$^{-1}$ and 150 cm$^{-1}$ (more preferably between 20 cm$^{-1}$ and 100 cm$^{-1}$).

The entire content of each of the aforementioned patents and patent applications are incorporated herein by reference.

The invention claimed is:

1. A filtration assembly (86) comprising:
    i) a hyperfiltration assembly (38) comprising:
        a) a high pressure vessel (40) comprising a feed port (42), concentrate port (43) and permeate port (44);
        b) a plurality of serially arranged spiral wound hyperfiltration membrane modules (2) located within the high pressure vessel (40) and each comprising at least one membrane envelop wound (4) around a permeate tube (8) forming a permeate pathway to the permeate port (44);
    ii) a bioreactor assembly (72) comprising:
        a) a low pressure vessel (73) comprising a first (80) and second (82) port,
        b) a plurality of spiral wound bioreactors (52) located within the low pressure vessel (73) with each bioreactor comprising a flat sheet (54) having two opposing bio-growth surfaces (56, 56') and a feed spacer (58) spirally wound about an axis (Y) to form a cylindrical outer periphery extending along axis (Y) from a first end (60) to a second end (62) with an inlet scroll face (64) located near the first end (60) and an outlet scroll face (66) located near the second end (62) and center conduit (70), wherein the conduit (70) is in fluid communication with the flat sheet and feed spacer only through the inlet or outlet scroll faces (64, 66), wherein the center conduits (70) of the bioreactors (52) are in fluid communication with each other and the second port (82); and
    iii) a fluid flow pathway adapted for fluid connection with a fluid feed source (88) and passing:
        a) into the first port (80) of the low pressure vessel (73), through the inlets of the scroll faces (64) and out of the outlet scroll faces (66) of the bioreactors (52), through the center conduits (70) and out the second port (82) of the low pressure vessel (73), and
        b) into the feed port (42) of the high pressure vessel (40), through the spiral wound hyperfiltration membrane modules (2) and out of the concentrate port (43) and permeate port (44).

2. The filtration assembly (86) of claim 1 wherein the fluid flow pathway follows a parallel flow pattern through the bioreactors (52) of the bioreactor assembly (72) and a serial flow pattern through the membrane modules (2) of the hyperfiltration assembly (38).

3. The filtration assembly (86) of claim 1 wherein:
    the low pressure vessel (73) defines a first (74) and second (76) chamber separated by a divider (78) wherein the first port (80) is in fluid communication with the first chamber (74) and the second port (82) is in fluid communication with the second chamber (76);
    the bioreactors (52) are positioned in a parallel arrangement within the low pressure vessel (73) with the inlet scroll face (64) of each bioreactor (52) in fluid communication with the first chamber (74) and the outlet scroll face (66) of each bioreactor (52) in fluid communication with the second chamber (76); and
    the fluid flow pathway extends: a) into the first port (80) of the low pressure vessel (73), into the first chamber (74), through the inlet scroll face (64) and outlet scroll face (66) of the bioreactors (52), into the second chamber (76) of the low pressure vessel (73), and out of the second port (82) of the low pressure vessel (73), and b) into the feed port (42) of the high pressure vessel (40), through the spiral wound hyperfiltration membrane modules (2) and out of the concentrate port (43) and permeate port (44).

4. The filtration assembly (86) of claim 1 wherein: the low pressure vessel (73) comprises a cylindrical inner chamber (84) in fluid communication with the first (80) and second (82) port and the bioreactors (52) are positioned in a serial arrangement within the cylindrical inner chamber of the low pressure vessel (73).

5. The filtration assembly (86) of claim 1 comprising at least one microfiltration or ultrafiltration device located along the fluid flow pathway at a location including at least one of:
  i) between the hyperfiltration assembly (38) and the bioreactor assembly (72), and
  ii) between a fluid feed source (88) and the bioreactor assembly (72).

6. The filtration assembly (86) of claim 1 further comprising a plurality of hyperfiltration assemblies (38) each in fluid communication with the bioreactor assembly (72), wherein the fluid flow pathway extends from the second port (82) of the low pressure vessel (73) of the bioreactor assembly (72) and into the feed port (42) of each hyperfiltration assembly (38).

7. The filtration assembly (86) of claim 1 further comprising a plurality of bioreactor assemblies (52) each in fluid communication with the hyperfiltration assembly (38), wherein the fluid flow pathway extends from the second port (82) of each bioreactor assembly (72) and into the feed port (42) of the hyperfiltration assembly (38).

8. The filtration assembly (86) of claim 1 wherein the flat sheet (54) of the bioreactor (52) is permeable and the two opposing bio-growth surfaces (56, 56') are in fluid communication with each other.

* * * * *